United States Patent
Bergsma

(10) Patent No.: US 10,311,332 B2
(45) Date of Patent: Jun. 4, 2019

(54) ORIENTATION-BASED SUBJECT-MATCHING IN IMAGES

(71) Applicant: Huawei Technologies Co., Ltd, Longgang, Shenzhen (CN)

(72) Inventor: Shane Anthony Bergsma, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 135 days.

(21) Appl. No.: 15/006,558

(22) Filed: Jan. 26, 2016

(65) Prior Publication Data

US 2017/0213108 A1     Jul. 27, 2017

(51) Int. Cl.
| | | |
|---|---|---|
| G06K 9/46 | (2006.01) | |
| G06K 9/62 | (2006.01) | |
| G06T 7/73 | (2017.01) | |
| G06K 9/66 | (2006.01) | |

(52) U.S. Cl.
CPC ............ *G06K 9/6215* (2013.01); *G06T 7/74* (2017.01); *G06K 9/4671* (2013.01); *G06K 9/66* (2013.01); *G06T 2207/10016* (2013.01); *G06T 2207/10024* (2013.01); *G06T 2207/20081* (2013.01)

(58) Field of Classification Search
None
See application file for complete search history.

(56) References Cited

U.S. PATENT DOCUMENTS 6,642,967 B1* 11/2003 Saunders ............. G11B 27/032
348/714
8,363,928 B1* 1/2013 Sharp ...................... H04N 7/18
348/143
8,429,173 B1* 4/2013 Rosenberg ........ G06F 17/30247
707/748
9,875,284 B1* 1/2018 Amacker ............ G06F 17/3053
2004/0190766 A1* 9/2004 Watanabe .............. B25J 9/1697
382/154
2010/0100457 A1* 4/2010 Rathod ............. G06F 17/30277
705/26.1
2012/0002880 A1* 1/2012 Lipson .............. G06F 17/30247
382/195

(Continued)

FOREIGN PATENT DOCUMENTS

| CN | 101510257 A | 8/2009 |
| JP | 2011-215843 | * 3/2010 |
| JP | 2011215843 A | 10/2011 |

OTHER PUBLICATIONS

CN 10151025 Machine Translation Zuo et al Aug. 19, 2009.*

(Continued)

*Primary Examiner* — Nancy Bitar
(74) *Attorney, Agent, or Firm* — Norton Rose Fulbright Canada LLP

(57) ABSTRACT

A system and method for subject-matching in images comprises detecting a first orientation of a first subject in a target image; comparing the first orientation with a second orientation of a second subject in a source image to obtain at least one orientation parameter; extracting at least one features from the target image; computing a visual similarity score between the target image and the source image using the features, the visual similarity score being computed as a function of the at least one feature and the at least one orientation parameter; and determining a match between the first subject and the second subject in accordance with the visual similarity score.

19 Claims, 8 Drawing Sheets

(56) References Cited

U.S. PATENT DOCUMENTS

2015/0169708 A1* 6/2015 Song ................ G06F 17/30247
707/722
2016/0117544 A1* 4/2016 Hoyos ............... H04N 5/23219
348/78

OTHER PUBLICATIONS

Gilbert et al., "Tracking objects across cameras by incrementally learning inter-camera colour calibration and patterns of activity", Computer Vision—ECCV 2006, 9th European Conference on Computer Vision, Graz, Austria, May 7-13, 2006, Proceedings, Part II, vol. 3952 of the series Lecture Notes in Computer Science, pp. 125-136.

Javed et al., "Modeling inter-camera space-time and appearance relationships for tracking across non-overlapping views", Computer Vision and Image Understanding, vol. 109, No. 2, 2008, pp. 146-162.

Avraham et al., "Learning implicit transfer for person re-identification", Computer Vision—ECCV 2012, Workshops and Demonstrations, Florence, Italy, Oct. 7-13, 2012, Proceedings, Part I, vol. 7583 of the series Lecture Notes in Computer Science, pp. 381-390.

Liu et al. "Person re-identification: What features are important?", Computer Vision—ECCV 2012, Workshops and Demonstrations, Florence, Italy, Oct. 7-13, 2012, Proceedings, Part I, vol. 7583 of the series Lecture Notes in Computer Science, pp. 391-401.

Das et al., "Consistent re-identification in a camera network", Computer Vision—ECCV 2014, 13th European Conference, Zurich, Switzerland, Sep. 6-12, 2014, Proceedings, Part II, vol. 8690 of the series Lecture Notes in Computer Science, pp. 330-345.

* cited by examiner

ORIENTATION-BASED SUBJECT-MATCHING IN IMAGES

FIELD

Embodiments described herein generally relate to the field of image analysis, and more particularly, to subject-matching in image analysis.

BACKGROUND

Subject-matching in images is the process of determining whether individuals in separate images are the same person. This matching is based on the visual similarity of the individual in each image, along with any knowledge of the time or location at which the images are taken. Generally, an individual depicted in a target image, sometimes taken from a video sequence, is compared with a source image, or training set, of possible matching images, to find the most similar match.

Visual information, also known as visual features, may be used for the comparison. For example, color features collected over horizontal stripes in the target sequence images may be compared with the same horizontal stripes in the source sequence images. Such features are relatively robust to changes in orientation of the subject, because the color of a subject is typically fairly constant along a horizontal axis.

However, there is a need to improve the accuracy of subject-matching for a wider range of possible situations.

SUMMARY

In accordance with one aspect, a method for subject-matching in images comprises detecting a first orientation of a first subject in a target image; comparing the first orientation with a second orientation of a second subject in a source image to obtain at least one orientation parameter; extracting at least one features from the target image; computing a visual similarity score between the target image and the source image using the features, the visual similarity score being computed as a function of the at least one feature and the at least one orientation parameter; and determining a match between the first subject and the second subject in accordance with the visual similarity score.

In accordance with another aspect, a system comprises a memory having stored therein a program comprising at least one sequence of instructions for subject-matching in images, and at least one processor coupled to the memory. The processor is configured for executing the at least one sequence of instructions for detecting a first orientation of a first subject in a target image; comparing the first orientation with a second orientation of a second subject in a source image to obtain at least one orientation parameter; extracting at least one features from the target image; computing a visual similarity score between the target image and the source image using the features, the visual similarity score being computed as a function of the at least one feature and the at least one orientation parameter; and determining a match between the first subject and the second subject in accordance with the visual similarity score.

In accordance with yet another aspect, a computer readable medium or media has stored thereon computer readable instructions executable by at least one processor. The instructions cause the processor to detect a first orientation of a first subject in a target image; comparing the first orientation with a second orientation of a second subject in a source image to obtain at least one orientation parameter; extract at least one features from the target image; compute a visual similarity score between the target image and the source image using the features, the visual similarity score being computed as a function of the at least one feature and the at least one orientation parameter; and determine a match between the first subject and the second subject in accordance with the visual similarity score.

In some example embodiments, computing a visual similarity score comprises applying weights to the features in accordance with the at least one orientation parameter to obtain the visual similarity score.

In some example embodiments, applying weights comprises applying a non-zero weight to feature types that are associated with the at least one orientation parameter.

In some example embodiments, extracting features comprises extracting features corresponding to feature types that are associated with the at least one orientation parameter.

In some example embodiments, the at least one orientation parameter corresponds to an orientation pair representative of the first orientation and the second orientation. An expected orientation pair may be associated with a higher weight than an unexpected orientation pair.

In some example embodiments, detecting orientation comprises characterizing orientation using at least two angles, the at least two angles comprising a first angle $\alpha$, along a horizontal plane, between a facing direction of the first subject and a viewing axis of an image acquisition device having acquired the target image, and a second angle $\beta$, along a vertical plane, between the viewing axis of the image acquisition device and a horizontal axis.

In some example embodiments, applying weights comprises applying a first set of weights when the first orientation and the second orientation are the same, and applying a second set of weights when the first orientation and the second orientation are different. In some example embodiments, applying a second set of weights comprises selecting the second set of weights from a group of weights as a function of a degree of difference between the first orientation and the second orientation.

In some example embodiments, the weights are applied by feature type.

In some example embodiments, the feature types are grouped together as a function of a sensitivity to orientation changes from a target image to a source image.

In some example embodiments, at least one feature type comprises sub-features having varying weights assigned thereto.

In some example embodiments, applying weights to the features comprises applying at least one fixed weight independent of the at least one orientation parameter.

In some example embodiments, the weights are determined using a training model configured for at least one of: learning an orientation-dependent distance metric; associating feature types with orientation parameters; learning transformations of color and SIFT features from target image to source image for a given image acquisition device pair; and learning predictable changes in orientation from target image to source image for the given image acquisition device pair.

Many further features and combinations thereof concerning the present improvements will appear to those skilled in the art following a reading of the instant disclosure.

DESCRIPTION OF THE FIGURES

In the figures.

It will be noted that throughout the appended drawings, like features are identified by like reference numerals.

DETAILED DESCRIPTION

There is described herein a method, system, and computer readable medium for performing subject-matching in images. Subject-matching refers to finding a match for a subject, such as a human, in an image or a sequence of images, when compared with another image or sequence of images. The image under investigation will be referred to herein as a target image. The image to which the target image is compared will be referred to herein as a source image. The target image may be obtained using any one of various types of image acquisition devices such as a still camera, a video camera, etc. A series of target images may represent a video sequence taken from a same image acquisition device, or separate images taken from multiple image acquisition devices. The source image may be obtained using the same or a different image acquisition device as the target image. The source image may be a scanned image of a known subject used for the purpose of subject-matching. In such a case, there may be no information available regarding the image acquisition device having acquired the source image. The source image may form part of a database of video surveillance data that has been divided into sequences depicting single individuals for ease of comparison.

Figure 1:
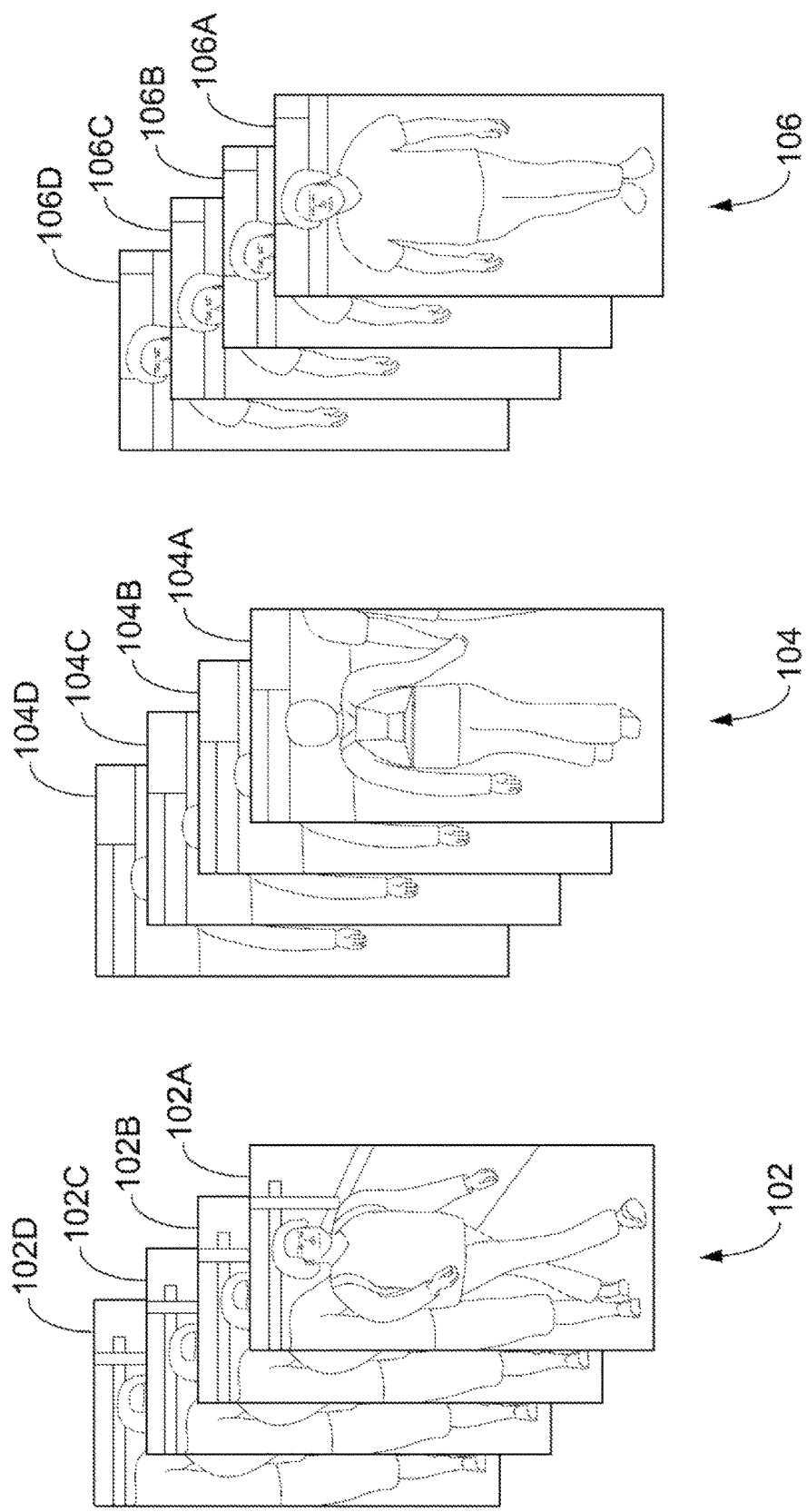
FIG. 1 is an example of image sequences for use as target sequences or source sequences.

FIG. 1 illustrates example sequences of images 102, 104, 106. In this example, each sequence 102, 104, 106 is composed of four images and may form part of a target sequence or a source sequence. The target sequence comprises one or more target images under investigation. The target images are the images from which it is desired to identify the subject. The source sequence comprises one or more source images. The source images are the images to which the target images are compared for identifying the subjects in the target images. For example, images 102a, 102b, 102c, 102d which form sequence 102 may correspond to a target sequence, and images 104a, 104b, 104c, 104d forming sequence 104 and images 106a, 106b, 106c, 106d forming sequence 106 may correspond to two different source sequences. Alternatively, sequence 104 may be a target sequence and sequences 102 and 106 may be source sequences. Each sequence may contain more or fewer than four images. As shown in sequences 102, 104, 106, the subject may have different orientations in different sequences. The embodiments described herein may be suitable for identifying the orientation of the subject in each sequence and using this data to control how different types of information are used to match subjects across sequences.

Figure 2:
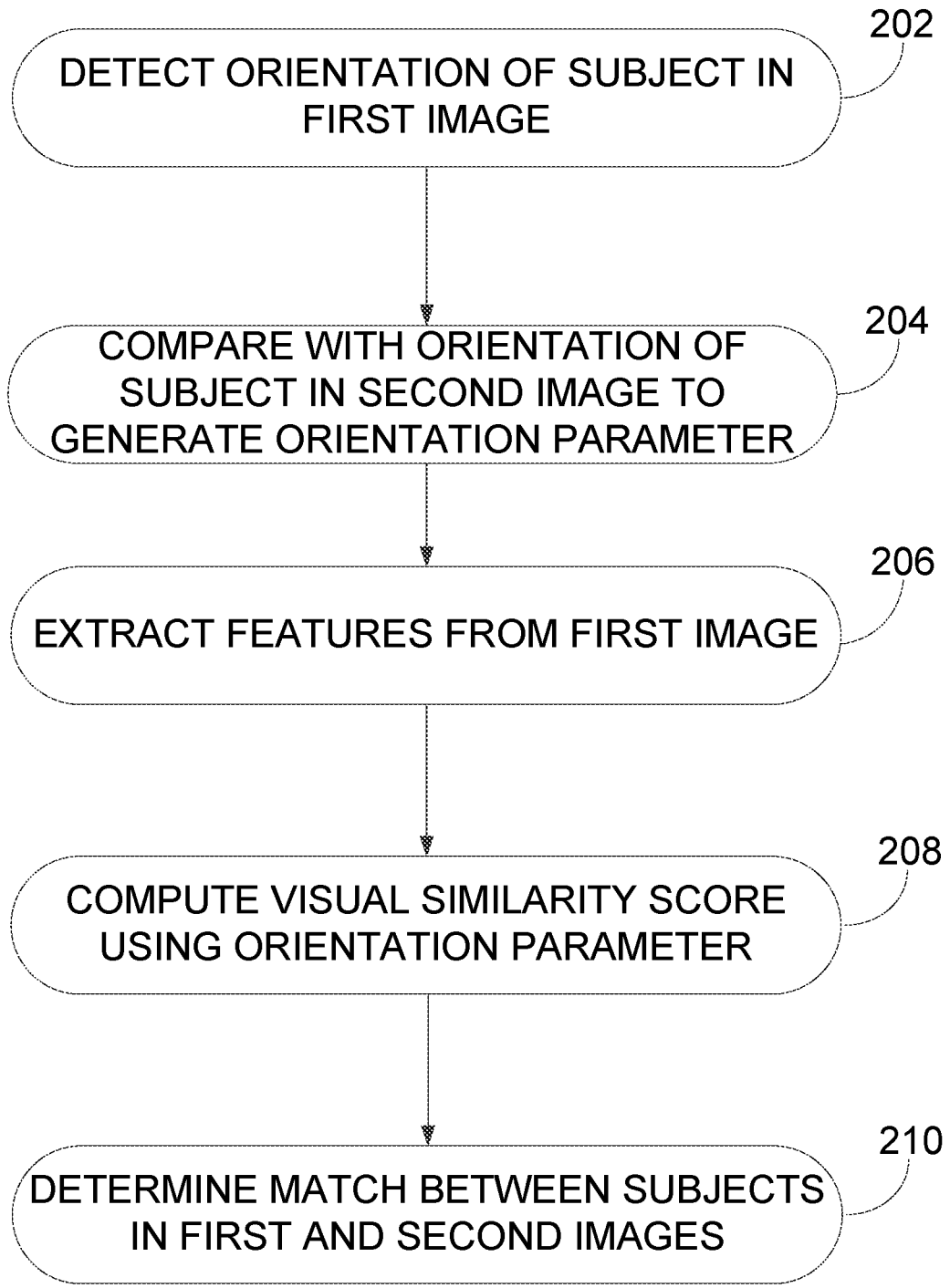
FIG. 2 is a flowchart of an example method for performing subject-matching.
Figure 3A:
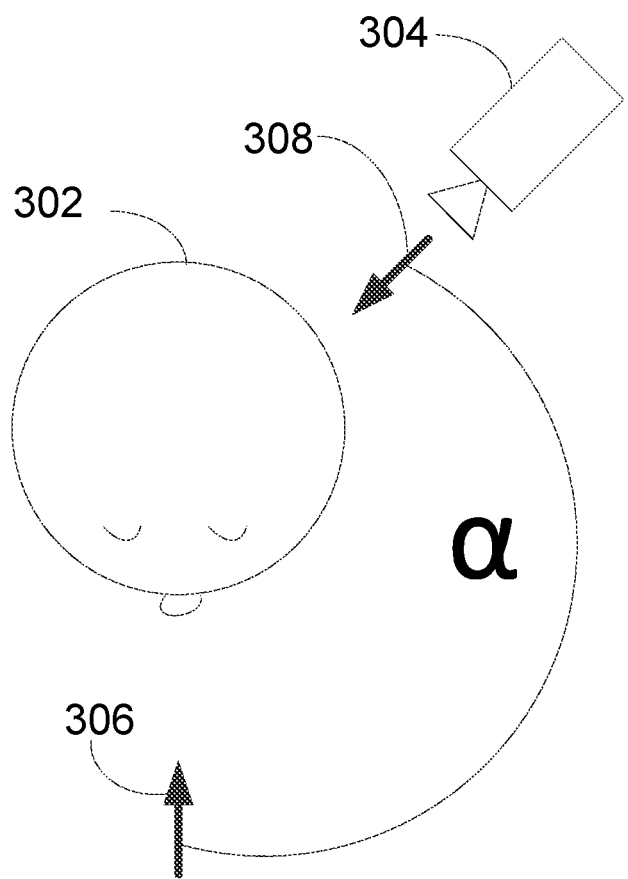
FIGS. 3A and 3B are schematic diagrams to illustrate example angles used to characterize orientation of a subject in an image.
Figure 3B:
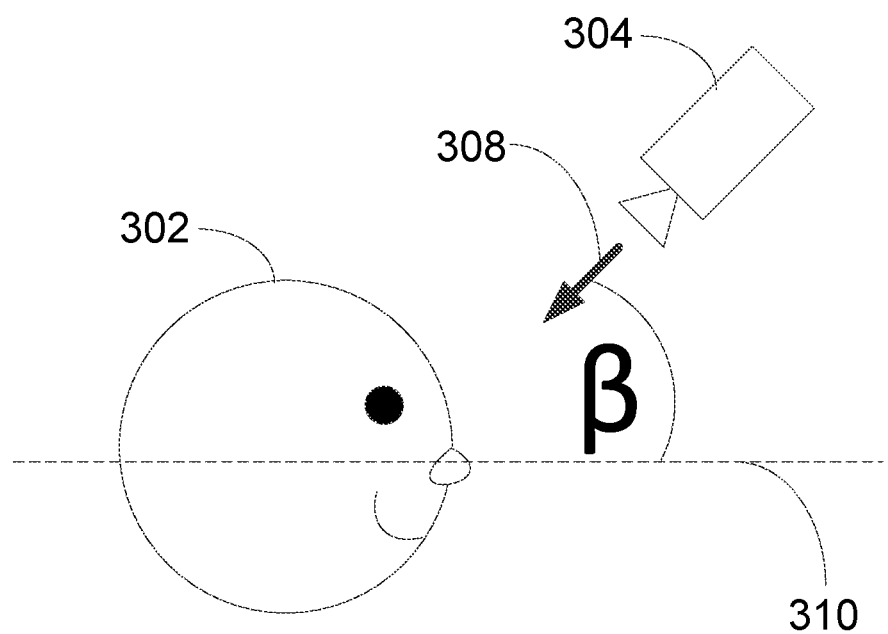

An embodiment for performing subject-matching is illustrated in the flowchart of FIG. 2. At 202, the orientation of a subject in a first image, namely the target image, is detected. For example, referring back to FIG. 1, the subject in sequence 102 and the subject in sequence 106 face the image acquisition device and the subject in sequence 104 faces away from the image acquisition device. Various embodiments may be used to characterize the orientation of a subject in an image. For example, orientation of a subject may be characterized using two angles, as illustrated in FIGS. 3A and 3B. A first angle α represents the angle between a facing direction 306 of a subject 302 and a viewing axis 308 of an image acquisition device 304 along a horizontal plane. Subject 302 is illustrated from a top view and the horizontal plane cuts across the subject 302 from front to back. A second angle β represents the angle between the viewing axis 308 of the image acquisition device 304 and a horizontal axis 310 along a vertical plane. Subject 302 is shown from a side view and the vertical plane cuts across the subject 302 from top to bottom. In some embodiments, angles α, β are given. Alternatively, angles α, β may be obtained using known information regarding positioning of an image acquisition device, size of the subject, and position of the subject in the field of view of the image acquisition device.

Referring back to FIG. 2, at 204, the detected orientation of the subject in the target image is compared with the orientation of a subject in a second image, namely the source image. In some embodiments, the orientation of the subject in the source image is predetermined and stored with the source image. The orientation of the subject in the source image may simply be retrieved for the purpose of the comparison. Alternatively, orientation detection for the subject in the source image may be performed concurrently with or subsequently to orientation detection for the subject in the target image. The comparison of the two orientations results in at least one orientation parameter, representative of the relative orientation of the two subjects. For example, the orientation parameter may correspond to "same" if the two orientations are the same, or "different" if the two orientations are different. In some embodiments, the orientation parameter may correspond to an orientation pair representative of the two orientations, such as F/F, F/B, B/F, and B/B (F=forward facing, B=back facing). In some embodiments, the orientation parameter may correspond to a difference in angle between the subject in the target image and the subject in the source image. For example, if the subject in the target image is rotated 15° from the image acquisition device and the subject in the source image is facing the image acquisition device directly, the orientation parameter may correspond to 15°−0°=15°. In some embodiments, the orientation parameter may be multi-dimensional, and may be defined by multiple values. Other embodiments of orientation parameters that suitably represent the difference in orientation between the subject in the target image and the subject in the source image may alternatively be used.

At 206, features are extracted from the target image. Generally, the features may be local features or global features. Examples of local features are those obtained using a scale-invariant feature transform (SIFT) algorithm. Local features are spatial, location-specific features which typically provide accurate results when there is no change in orientation between a target image and a source image. Examples of global features are color- or texture-based features obtained using, for example, a Red, Green, Blue (RGB), Hue, Saturation, Value (H,S,V), or luminance and chrominance (Y, Cb, Cr) color model. Global features are typically robust to changes in orientation. For example, a bounding box may be divided into a plurality of horizontal stripes. Each stripe is described by a histogram with multiple bins for each color component H, S, and V. In general, image features may capture different aspects of the image, such as color, texture, patterns, small image patches, etc. Other embodiments for feature extraction will be readily understood. Note that feature extraction, as per 206, may be performed earlier in the method, e.g. before orientation detection and generating of an orientation parameter 202, 204 or concurrently therewith. In some embodiments, a set of predetermined features are extracted from the target image regardless of the detected orientation. In these embodiments, the extraction of features may be performed at any time before computing a visual similarity score. In other embodiments, the features to be extracted are determined as a function of the orientation parameter. For example, color features may be extracted when the orientation parameter is "different", and spatial features may be extracted when the orientation parameter is "same". In these embodiments, features will be extracted after the orientation parameter has been generated at 204. In some embodiments, features from the source image are pre-extracted and stored with the source image. Features stored with the source image may be retrieved for the purpose of computing the visual similarity score. Alternatively, feature extraction from the source image may be performed concurrently with or subsequently to feature extraction from the target image.

At 208, a visual similarity score is computed using at least some of the features as extracted from both the target and source image, as a function of the orientation parameter. The orientation parameter is used to determine a best use of image features, i.e. which features should be considered given the difference in orientation between the target and the source image, so as to maximize the accuracy of the result. For example, color features may be used when the orientation parameter is "different" and spatial features may be used when the orientation parameter is "same". In some embodiments, the visual similarity score will only use a given type of feature and discard other types of features, as a function of the orientation parameter. In other embodiments, the visual similarity score will be computed using different types of features, and each feature type will be assigned a weight as a function of the orientation parameter. For example, color features may be assigned a greater weight than spatial features when the orientation parameter is "different", and spatial features may be assigned a greater weight when the orientation parameter is "same". Feature types may be grouped as a function of a sensitivity to changes in orientation, or each feature type may be assigned its own weight. In some embodiments, each feature within a given feature type may be assigned its own weight.

At 210, a match between subjects in the target image and the source image is determined in accordance with the visual similarity score as computed. In some embodiments, a threshold may be set for the similarity score, above which the subjects are considered to be a match. A similarity score found to be below the threshold would be indicative of no match. In other embodiments, a greatest visual similarity score (or smallest distance) obtained from comparing a target image to a plurality of source images is indicative of a match and all other scores are indicative of no match. Other information may also be used, either when computing the visual similarity score or when determining whether the subjects in the images match. For example, the target and source image acquisition devices may be positioned such that a subject passing from one to the other may result in an expected orientation parameter, and expected orientation parameters may be reflected in higher weights on certain features, compared to weights arising from unexpected orientation parameters. Time and/or location of image acquisition may also weigh into subject-matching, either as complementary information used to validate a matching result, or as additional parameters in the visual similarity score.

Figure 4:
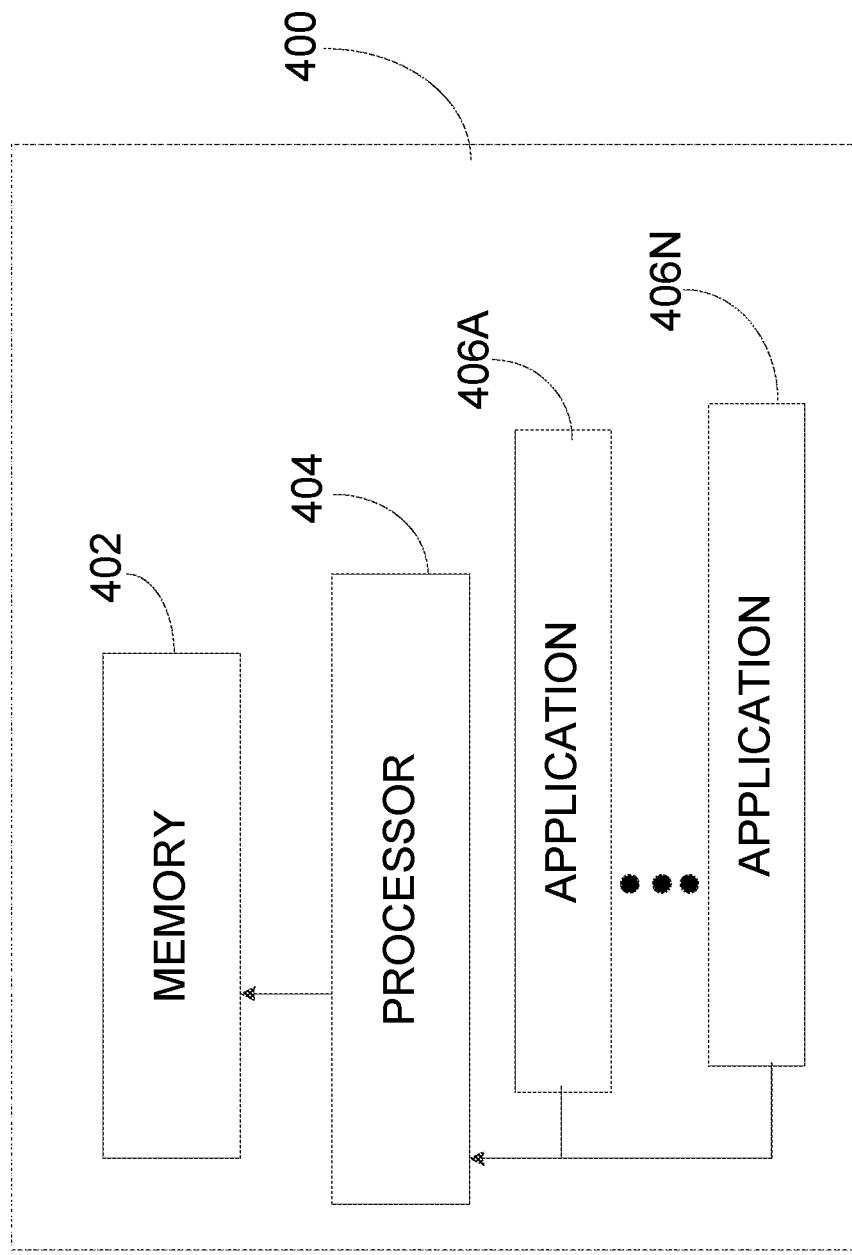
FIG. 4 is a block diagram of an example embodiment for a subject-matching system.

Reference is now made to FIG. 4, illustrating an embodiment for a subject-matching system 400. The system 400 comprises, amongst other things, a plurality of applications 406a . . . 406n running on a processor 404 coupled to a memory 402. It should be understood that although the applications 406a . . . 406n presented herein are illustrated and described as separate entities, they may be combined or separated in a variety of ways. The memory 402 accessible by the processor 404 may receive and store data. The memory 402 may have stored therein target images, source images, information on image acquisition devices, information on when images were acquired, extracted features, determined orientations, weights, visual similarity scores, matching thresholds, and any other data or information acquired from the images and/or the image acquisition devices, and/or used to perform subject-matching. The memory 402 may be a main memory, such as a high speed Random Access Memory (RAM), or an auxiliary storage unit, such as a hard disk, a floppy disk, or a magnetic tape drive. The memory 402 may be any other type of memory, such as a Read-Only Memory (ROM), or optical storage media such as a videodisc or a compact disc. The processor 404 may access the memory 402 to retrieve data. The processor 404 may be any device that can perform operations on data. Examples are a central processing unit (CPU), a front-end processor, a microprocessor, and a network processor. The applications 406a . . . 406n are coupled to the processor 404 and configured to perform various tasks. An output may be transmitted to an external device or displayed on a graphical user interface (not shown).

Figure 5:
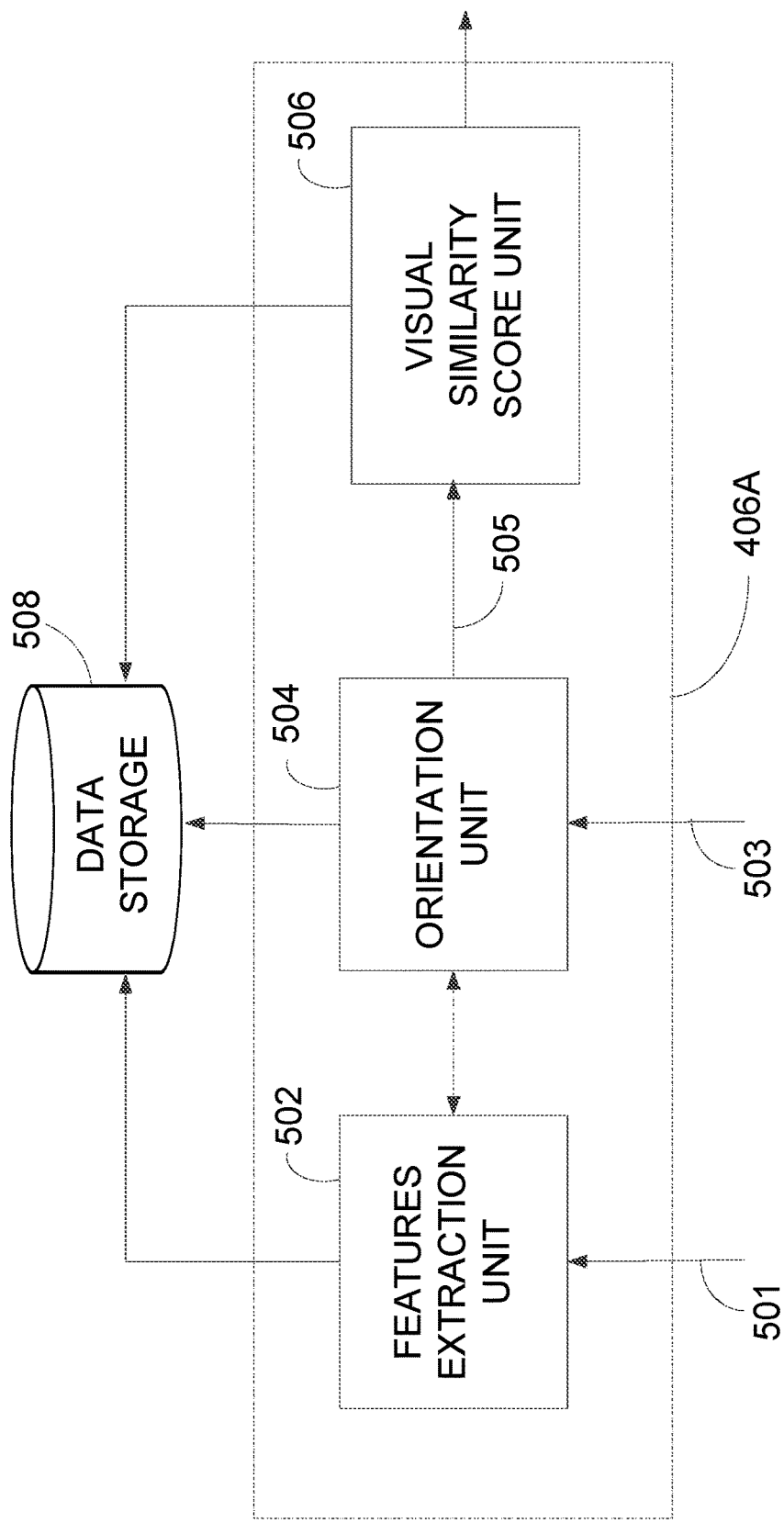
FIG. 5 is a block diagram of an example embodiment for an application running on the processor of FIG. 4.

FIG. 5 is an example embodiment of an application 406a running on the processor 404. The application 406a comprises a features extraction unit 502, an orientation unit 504, and a visual similarity score unit 506. A data storage 508 may correspond to memory 402 or to alternative storage means, provided locally or remotely to the system 400. The features extraction unit 502 may be commanded by a control signal 501 to perform feature extraction, either generally or specifically. Generally is meant to refer to extraction of all features, regardless of orientation. Specifically is meant to refer to extraction of features selected as a function of the orientation parameter. Extracted features may be stored in data storage 508. In some embodiments, the features extraction unit 502 may transmit extracted features directly to the visual similarity score unit 506. In some embodiments, the orientation unit 504 may be configured to communicate with the features extraction unit 502 for extraction of specific features. Alternatively, the features extraction unit may be solely controlled by control signal 501.

Figure 6:
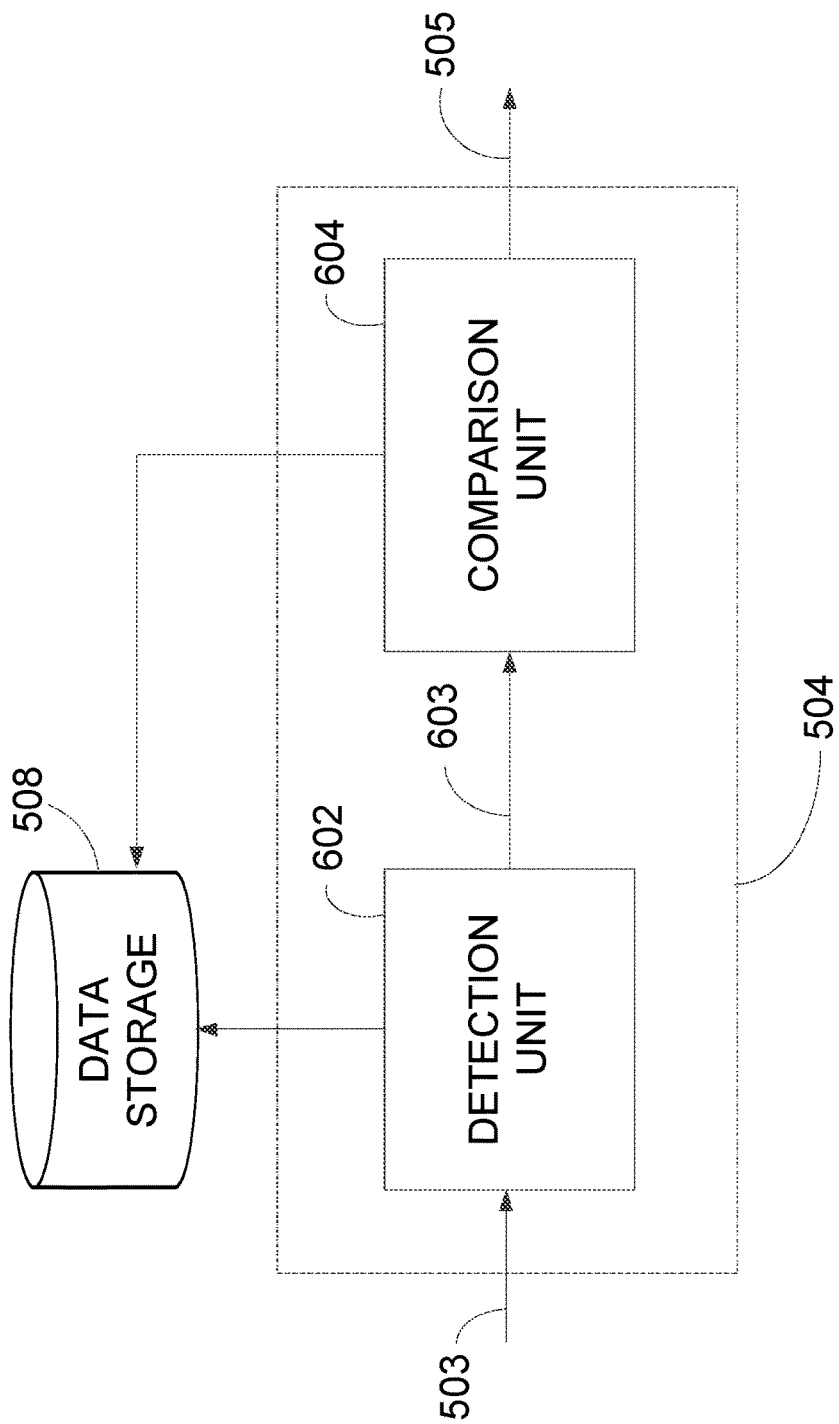
FIG. 6 is a block diagram of an example embodiment for the orientation unit of FIG. 5.

The orientation unit 504 is configured for orientation detection. It may be triggered by a control signal 503. The control signal 503 may be commanded by a user via a graphical user interface on the system 400 or via an external device (not shown) operatively connected to the system 400. The connection between the system 400 and the external device may be wired or wireless. Control signal 503 may also be generated by another application 406n. The other application 406n may form part of the system 400 or be provided separately therefrom. FIG. 6 is an example embodiment for the orientation unit 504, comprising a detection unit 602 and a comparison unit 604. The detection unit 602 may be configured to detect orientation of the subject in the target image, and in some cases to also detect orientation of the subject in the source image, and the comparison unit 604 may be configured to compare the orientations from the target image and the source image and generate the orientation parameter. Detected orientations may be stored in the data storage 508. The comparison unit 604 may be triggered via a control signal 603, for generating the orientation parameter. The comparison unit 604 may, upon receipt of control signal 603, access the data storage 508 to retrieve the orientation of the target image and the orientation of the source image. In some embodiments, the orientations of the target and source images are transmitted directly to the comparison unit 604 via control signal 603. The orientation parameter may be output by the comparison unit 604 via control signal 505, or stored in data storage 508. Control signal 505 may thus indicate to the visual similarity score unit that the orientation parameter has been generated.

Figure 7:
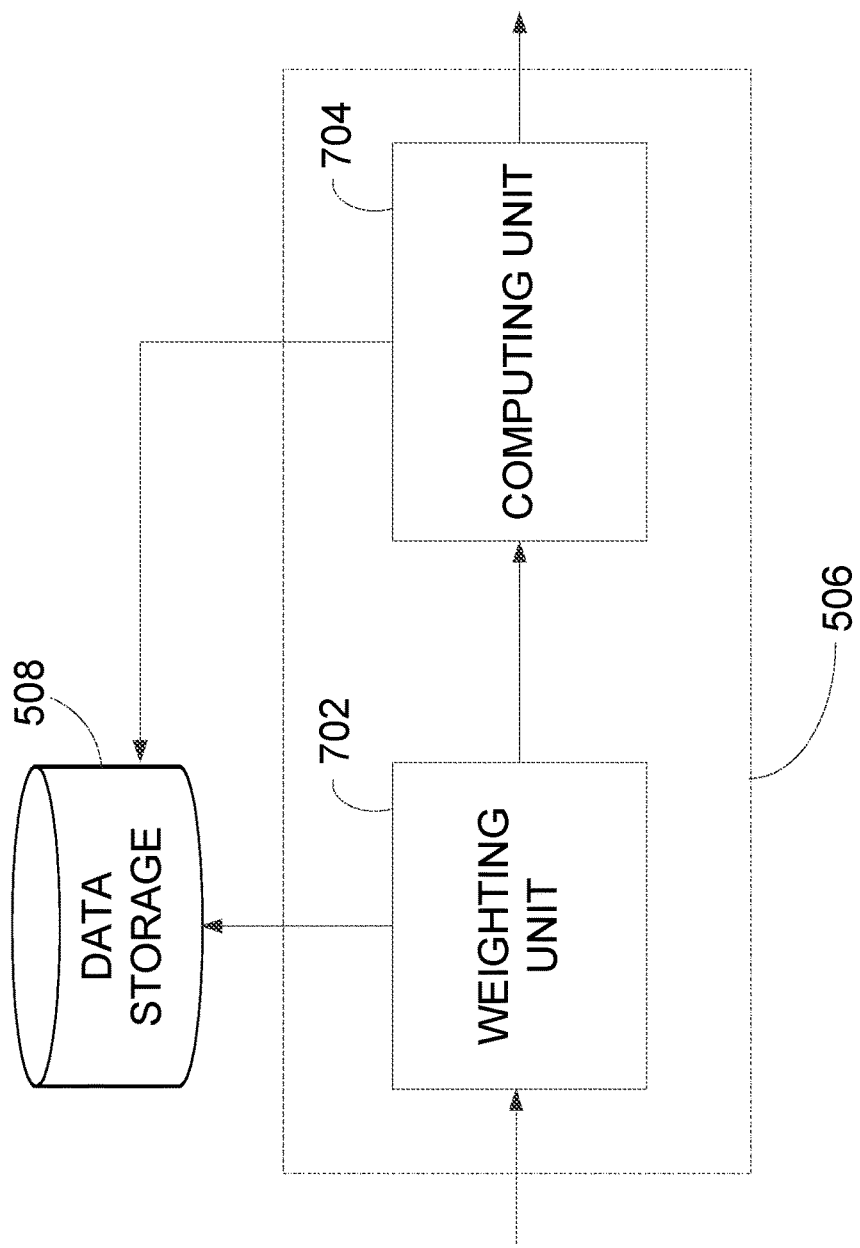
FIG. 7 is a block diagram of an example embodiment for the visual similarity score unit of FIG. 5.

FIG. 7 is an example embodiment of the visual similarity score unit 506. A weighting unit 702 and a computing unit 704 may be configured to compute the visual similarity score using the orientation parameter and determine a match between a target image and a source image as a function of the visual similarity score. For each video sequence or image 102, 104, 106, a feature vector $\underline{f}$ is created. The weighting unit 702 is configured to decompose each feature vector $\underline{f}$ into subvectors by feature type. For example, a target feature vector may correspond to $\underline{f}^t = <\underline{f}_1^t, \underline{f}_2^t, \underline{f}_3^t, >$ (where the subscript indicates the index of the subvector within the overall vector), and a source feature vector may correspond to $\underline{f}^s = <\underline{f}_1^s, \underline{f}_2^s, \underline{f}_3^s, >$. In some embodiments, the target image is compared with a plurality of source images and a match corresponds to a smallest distance $d = \text{dist}(\underline{f}^t, \underline{f}^s)$ between the target vector and one of the source vectors. The distance over the subvectors is $d_1 = \text{dist}(\underline{f}_1^t, \underline{f}_1^s)$, $d_2 = \text{dist}(\underline{f}_2^t, \underline{f}_2^s)$, $d_3 = \text{dist}(\underline{f}_3^t, \underline{f}_3^s)$, etc. When considering only certain subvectors, or feature types, the weighting unit 702 may apply a weight of one (1) to selected subvectors and a weight of zero (0) to unselected subvectors. The computing unit 704 may compute the distance as the Euclidean distance of $\|\underline{f}^t - \underline{f}^s\|$ for each selected subvector.

In some embodiments, contribution of a subvector is weighted differently as a function of the orientation parameter. For example, when having two subvector distances $d_1$ and $d_2$, a match may correspond to the smallest value for $\lambda_{t,s}^1 d_1 + \lambda_{t,s}^2 d_2$, where $\lambda_{t,s}^i$ is a parameter that depends on (a) the type of feature in the subvector, i (e.g., i=1 or i=2), and (b) the orientations of the target and source subjects, t,s, (e.g. ($\alpha_t$, $\beta_t$, $\alpha_s$, $\beta_s$)). Using an example with four target/source orientation pairs, namely F/F, F/B, B/F, B/B, then similarity (or distance) may be computed as $\lambda_{F/F}^1 d_1 + \lambda_{F/F}^2 d_2$ if target and source are F/F, and as $\lambda_{F/B}^1 d_1 + \lambda_{F/B}^2 d_2$, if target and source are F/B. The weighting of the two feature types is thus set dynamically depending on the orientation of the target and source images.

In some embodiments, the visual similarity score unit 506 is configured for machine learning, and uses training data to find the appropriate weights for each subvector. For example using the four orientation pairs F/F, F/B, B/F, B/B, an eight-dimension feature vector $\underline{x}$ may be created with two non-zero features for any pair as per Table 1:

TABLE 1

| | | | | | | | | | |
|---|---|---|---|---|---|---|---|---|---|
| $\underline{x} = <$ | $d_1$, | $d_2$, | 0, | 0, | 0, | 0, | 0, | 0 | > If F/F |
| $\underline{x} = <$ | 0, | 0, | $d_1$, | $d_2$, | 0, | 0, | 0, | 0 | > If F/B |
| $\underline{x} = <$ | 0, | 0, | 0, | 0, | $d_1$, | $d_2$, | 0, | 0 | > If B/F |
| $\underline{x} = <$ | 0, | 0, | 0, | 0, | 0, | 0, | $d_1$, | $d_2$ | > If B/B |

In this example, the non-zero features come in pairs. The first feature is $d_1$ and corresponds to a color feature and the next feature is $d_2$ and corresponds to a SIFT feature. The score for each pair is $\underline{\lambda} \cdot \underline{x}$, where $\underline{\lambda} = (\lambda_{FF}^1, \lambda_{FF}^2, \lambda_{FB}^1, \lambda_{FB}^2, \lambda_{BF}^1, \lambda_{BF}^2, \lambda_{BB}^1, \lambda_{BB}^2)$. In some embodiments, the parameters $\underline{\lambda} = (\lambda_{FF}^1, \lambda_{FF}^2, \lambda_{FB}^1, \lambda_{FB}^2, \lambda_{BF}^1, \lambda_{BF}^2, \lambda_{BB}^1, \lambda_{BB}^2)$ may be set manually.

In some embodiments, a fixed weight may be set on one or more of the feature types. For example, using the four orientation pairs F/F, F/B, B/F, B/B, a five-dimensional feature vector $\underline{x}$ may be created with two non-zero features for any pair as per Table 2:

TABLE 2

| | | | | | | |
|---|---|---|---|---|---|---|
| $\underline{x} = <$ | $d_1$, | $d_2$, | 0, | 0, | 0 | > If F/F |
| $\underline{x} = <$ | $d_1$, | 0, | $d_2$, | 0, | 0 | > If F/B |
| $\underline{x} = <$ | $d_1$, | 0, | 0, | $d_2$, | 0 | > If B/F |
| $\underline{x} = <$ | $d_1$, | 0, | 0, | 0, | $d_2$ | > If B/B |

In this example, the first feature is $d_1$ (a color feature) and then one of the next four features is $d_2$ (a SIFT feature). The score for each pair is $\underline{\lambda} \cdot \underline{x}$, where $\underline{\lambda} = (\lambda_1, \lambda_{FF}, \lambda_{FB}, \lambda_{BF}, \lambda_{BB})$. The weight on $d_1$ is $\lambda_1$ and does not depend on the orientation parameter.

There may be more than two feature types. For example, there may be multiple SIFT sets with different pooling (where pooling is an operation that affects the extracted features), as per Table 3:

TABLE 3

| | | | | | | | | | |
|---|---|---|---|---|---|---|---|---|---|
| $\underline{x} = <$ | $d_{color}$, | $d_{sift1}$, | $d_{sift2}$, | 0, | 0, | 0, | 0, | 0 | > If F/F |
| $\underline{x} = <$ | $d_{color}$, | 0, | 0, | $d_{sift1}$, | $d_{sift2}$, | 0, | 0, | 0 | > If F/B |
| $\underline{x} = <$ | $d_{color}$, | 0, | 0, | 0, | 0, | $d_{sift1}$, | $d_{sift2}$, | 0 | > If B/F |
| $\underline{x} = <$ | $d_{color}$, | 0, | 0, | 0, | 0, | 0, | $d_{sift1}$, | $d_{sift2}$ | > If B/B |

In this example, the score for each pair is $\underline{\lambda} \cdot \underline{x}$, where $\underline{\lambda} = (\lambda_0, \lambda_{SIFT1FF}, \lambda_{SIFT2FF}, \lambda_{SIFT1FB}, \lambda_{SIFT2FB}, \lambda_{SIFT1BF}, \lambda_{SIFT2BF}, \lambda_{SIFT1BB}, \lambda_{SIFT2BB})$. This lets the SIFT features have different weights depending on the orientation parameters, but fixes the weights on color features. Similarly, color weights may also be configured to differ as a function of the orientation parameter, and the weights on SIFT features may be fixed. In some embodiments, both SIFT weights and color weights may vary as a function of the orientation parameter. In addition, a greater number of feature types and/or pooling combinations may be used.

In some embodiments, the accuracy obtained with certain features, for example color features, may also depend on the image acquisition device pair. If trained and used for a particular pair of devices, then the visual similarity score unit 506 may learn to down-weight color features if they are not likely to be effective. For example, the unit 506 may learn that blue colors become dark blue for a given device pair. Alternatively, or in combination therewith, the unit 506 may model expected orientations for a given pair of devices by learning how much to weight SIFT depending on orientation. Table 4 is an example using both types of learning:

TABLE 4

| | | | | | | |
|---|---|---|---|---|---|---|
| $\underline{x} = <$ | $\underline{f}_{color}^t$, | $\underline{f}_{color}^s$, | $d_{sift}$, | 0, | 0, | 0 | > If F/F |
| $\underline{x} = <$ | $\underline{f}_{color}^t$, | $\underline{f}_{color}^s$, | 0, | $d_{sift}$, | 0, | 0 | > If F/B |
| $\underline{x} = <$ | $\underline{f}_{color}^t$, | $\underline{f}_{color}^s$, | 0, | 0, | $d_{sift}$, | 0 | > If B/F |
| $\underline{x} = <$ | $\underline{f}_{color}^t$, | $\underline{f}_{color}^s$, | 0, | 0, | 0, | $d_{sift}$ | > If B/B |

In this example, there are only four parameters for the SIFT and orientation weighting, with the rest of the parameters being dedicated to model color transfer. This may be extended to multi-device situations, by adding new subspaces for color features.

In some embodiments, weights may vary as a function of the individual features, within a given feature type. For example, a learned distance metric, represented by a distance vector $\underline{D}$, may be used to determine that leg colors are more useful than torso colors when orientation changes from the target image to the source image. The distance vector $\underline{D}$ may correspond to a point-wise difference between a target feature vector $\underline{x}^t$ and a source feature vector $\underline{x}^s$. For example, $\underline{D}_{L1}=<\mathrm{abs}(x^t_1-x^s_1), \mathrm{abs}(x^t_2-x^s_2), \ldots >$. An example of an eight dimension feature vector $\underline{x}$ using the learned distance metric is as per Table 5:

TABLE 5

| | | | | | | | | |
|---|---|---|---|---|---|---|---|---|
| $\underline{x} = <$ $\underline{D}_{sift}$, | $\underline{D}_{color}$, | 0, | 0, | 0, | 0, | 0, | 0 | $>$ If F/F |
| $\underline{x} = <$ 0, | 0, | $\underline{D}_{sift}$, | $\underline{D}_{color}$, | 0, | 0, | 0, | 0 | $>$ If F/B |
| $\underline{x} = <$ 0, | 0, | 0, | 0, | $\underline{D}_{sift}$, | $\underline{D}_{color}$, | 0, | 0 | $>$ If B/F |
| $\underline{x} = <$ 0, | 0, | 0, | 0, | 0, | 0, | $\underline{D}_{sift}$, | $\underline{D}_{color}$ | $>$ If B/B |

In some embodiments, the distance vectors may be shared among all of the feature vectors, such that this information is re-used by default, while also indexing each vector by orientation pair, as per Table 6:

TABLE 6

| SHARED | | F/F | | F/B | | B/F | | B/B | | |
|---|---|---|---|---|---|---|---|---|---|---|
| $\underline{x} = <$ $D_{sift}$, | $D_{color}$, | $D_{sift}$, | $D_{color}$, | 0, | 0, | 0, | 0, | 0, | 0 | $>$ If F/F |
| $\underline{x} = <$ $D_{sift}$, | $D_{color}$, | 0, | 0, | $D_{sift}$, | $D_{color}$, | 0, | 0, | 0, | 0 | $>$ If F/B |
| $\underline{x} = <$ $D_{sift}$, | $D_{color}$, | 0, | 0, | 0, | 0, | $D_{sift}$, | $D_{color}$, | 0, | 0 | $>$ If B/F |
| $\underline{x} = <$ $D_{sift}$, | $D_{color}$, | 0, | 0, | 0, | 0, | 0, | 0, | $D_{sift}$, | $D_{color}$ | $>$ If B/B |

In some embodiments, concatenation vectors are used instead of distance vectors. The concatenation vectors may be used, for example, to learn that certain colors or key points on one side of the target image in a region of interest match the colors or key points on the other side of the region of interest in the source image when a subject is front facing in the target image and back facing in the source image. Other learning options may also be applied.

In some embodiments, certain features are independent of orientation and other features are learned as being orientation-specific, as per Table 7:

TABLE 7

| | | | | | | | | | | |
|---|---|---|---|---|---|---|---|---|---|---|
| $\underline{x} = <$ $\underline{f}_{color}^t$, | $\underline{f}_{color}^s$, | $\underline{f}_{sift}^t$, | $\underline{f}_{sift}^s$, | 0, | 0, | 0, | 0, | 0, | 0 | $>$ If F/F |
| $\underline{x} = <$ $\underline{f}_{color}^t$, | $\underline{f}_{color}^s$, | 0, | 0, | $\underline{f}_{sift}^t$, | $\underline{f}_{sift}^s$, | 0, | 0, | 0, | 0 | $>$ If F/B |
| $\underline{x} = <$ $\underline{f}_{color}^t$, | $\underline{f}_{color}^s$, | 0, | 0, | 0, | 0, | $\underline{f}_{sift}^t$, | $\underline{f}_{sift}^s$, | 0, | 0 | $>$ If B/F |
| $\underline{x} = <$ $\underline{f}_{color}^t$, | $\underline{f}_{color}^s$, | 0, | 0, | 0, | 0, | 0, | 0, | $\underline{f}_{sift}^t$, | $\underline{f}_{sift}^s$ | $>$ If B/B |

In this example, color transformation features are considered in the first two subspaces for each vector, and then SIFT transformation and relative weighting is learned while taking into account orientation. Transfer features may be grouped as a function of orientation sensitivity. Across devices, there may be a feature subspace for each device, which holds color features for the target and the source, and a feature subspace for each orientation change, which holds SIFT features for the target and the source.

Other variations and/or combinations may be used for the different feature subspaces. Generally, the feature subspaces may be used to train a model to learn which feature types are important, which weightings on features are orientation-change dependent, which transformations of features are image acquisition device dependent, which transformations of features are orientation-change dependent, and/or to learn and exploit predictable changes in orientation from target to source. Although illustrated with an orientation parameter that corresponds to four possible orientation pairs of F/F, F/B, B/F, B/B, each embodiment may be adapted to other orientation parameters, such as same/different or an angle value difference. In addition, features of the embodiments described may be combined in different ways.

One skilled in the relevant arts will recognize that changes may be made to the embodiments described above without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified.

Although illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. Based on such understandings, the technical solution of the present invention may be embodied in the form of a software product. The software product may be stored in a non-volatile or non-transitory storage medium, which may be, for example, a compact disk read-only memory (CD-ROM), USB flash disk, or a removable hard disk. The software product may include a number of instructions that enable a computer device (personal computer, server, or network device) to execute the methods provided in the embodiments of the present invention. The structure illustrated is thus provided to increase efficiency of teaching the present embodiment. The present disclosure may be embodied in other specific forms without departing from the subject matter of the claims.

Also, one skilled in the relevant arts will appreciate that although the systems, methods and computer readable mediums disclosed and shown herein may have a specific number of elements/components, the systems, methods and computer readable media may be modified to include additional or fewer of such elements/components. In addition, alternatives to the examples provided above are possible in view of specific applications. For instance, emerging technologies (e.g. fifth generation (5G) and future technologies) are expected to require higher performance processors to address ever growing data bandwidth and low-latency connectivity requirements. Therefore, new devices will be required to be smaller, faster and more efficient. Some embodiments can specifically be designed to satisfy the various demands of such emerging technologies. The embodiments described herein may be applied in parallel programming, cloud computing, and other environments for big data, as well as in embedded devices, or on custom hardware such as GPUs or FPGAs.

The present disclosure is also intended to cover and embrace all suitable changes in technology. Modifications which fall within the scope of the present invention will be apparent to those skilled in the art, and, in light of a review of this disclosure, such modifications are intended to fall within the appended claims.

What is claimed is:

1. A computer-implemented method for subject-matching in images, the method comprising:
   detecting, by a processor, a first orientation of a first subject in a target image using at least two angles, the at least two angles comprising a first angle $\alpha$, in a horizontal plane, between a facing direction of the first subject and a viewing axis of an image acquisition device having acquired the target image, and a second angle $\beta$, in a vertical plane, between the viewing axis of the image acquisition device and a horizontal axis, the first orientation indicative of the facing direction of the first subject relative to the image acquisition device;
   comparing, by the processor, the first orientation of the first subject with a second orientation of a second subject in a source image to obtain an orientation parameter indicative of a relative orientation of the first subject in the target image to the second subject in the source image;
   extracting, by the processor, one or more features from the target image;
   computing, by the processor, a visual similarity score between the target image and the source image as a function of the one or more features extracted from the target image and weights assigned to the one or more features extracted from the target image as a function of the orientation parameter; and
   determining, by the processor, a match between the first subject and the second subject in accordance with the visual similarity score.

2. The method of claim 1, further comprising assigning a non-zero weight to feature types that are associated with the orientation parameter.

3. The method of claim 1, wherein extracting one or more features from the target image comprises extracting the one or more features from the target image based on a feature type that is associated with the orientation parameter.

4. The method of claim 1, wherein the orientation parameter corresponds to an orientation pair representative of the first orientation and the second orientation.

5. The method of claim 4, wherein the orientation pair is an expected orientation pair that is associated with a higher weight than an unexpected orientation pair.

6. The method of claim 1, further comprising assigning a first set of weights when the first orientation and the second orientation are the same, and assigning a second set of weights when the first orientation and the second orientation are different.

7. The method of claim 6, wherein assigning a second set of weights comprises selecting the second set of weights from a group of weights as a function of a difference between the first orientation and the second orientation.

8. The method of claim 1, wherein each weight is assigned by feature type.

9. A system comprising:
   a memory having stored therein a program comprising instructions for subject-matching in images; and
   at least one processor coupled to the memory for executing the instructions for:
      detecting a first orientation of a first subject in a target image using at least two angles, the at least two angles comprising a first angle $\alpha$, in a horizontal plane, between a facing direction of the first subject and a viewing axis of an image acquisition device having acquired the target image, and a second angle $\beta$, in a vertical plane, between the viewing axis of the image acquisition device and a horizontal axis, the first orientation indicative of the facing direction of the first subject relative to the image acquisition device;
      comparing the first orientation of the first subject with a second orientation of a second subject in a source image to obtain an orientation parameter indicative of a relative orientation of the first subject in the target image to the second subject in the source image;
      extracting one or more features from the target image;
      computing a visual similarity score between the target image and the source image as a function of the one or more features extracted from the target image and weights assigned to the one or more features extracted from the target image as a function of the orientation parameter;
      determining a match between the first subject and the second subject in accordance with the visual similarity score.

10. The system of claim 9, wherein assigning weights comprises applying a non-zero weight to feature types that are associated with the at least one orientation parameter.

11. The system of claim 9, wherein extracting one or more features from the target image comprises extracting the one features based on a feature type that is associated with the orientation parameter.

12. The system of claim 9, wherein the orientation parameter corresponds to an orientation pair representative of the first orientation and the second orientation.

13. The system of claim 12, wherein the orientation pair is an expected orientation pair is associated with a higher weight than an unexpected orientation pair.

14. The system of claim 9, further comprising assigning a first set of weights when the first orientation and the second orientation are the same, and assigning a second set of weights when the first orientation and the second orientation are different.

15. The system of claim 14, wherein assigning a second set of weights comprises selecting the second set of weights from a group of weights as a function of a difference between the first orientation and the second orientation.

16. The system of claim 9, wherein the weights are assigned by feature type.

17. A non-transitory computer readable medium or media having stored thereon computer readable instructions which when executed by at least one processor, cause the at least one processor to:

detect a first orientation of a first subject in a target image using at least two angles, the at least two angles comprising a first angle α, in a horizontal plane, between a facing direction of the first subject and a viewing axis of an image acquisition device having acquired the target image, and a second angle β, in a vertical plane, between the viewing axis of the image acquisition device and a horizontal axis, the first orientation indicative of the facing direction of the first subject relative to the image acquisition device;

compare the first orientation of the first subject with a second orientation of a second subject in a source image to obtain an orientation parameter indicative of a relative orientation of the first subject in the target image to the second subject in the source image;

extract one or more features from the target image;

compute a visual similarity score between the target image and the source image as a function of the one or more features and weights assigned to the one or more features extracted from the target image as a function of the orientation parameter; and determine a match between the first subject and the second subject in accordance with the visual similarity score.

18. The method of claim 1, further comprising:

extracting, by the processor, one or more features from the source image; and wherein computing further comprises computing, by the processor, the visual similarity score between the target image and the source image as a function of the one or more features extracted from the source image and weights assigned to the one or more features extracted from the source image as a function of the orientation parameter.

19. The system of claim 9, wherein the at least one processor is coupled to the memory for executing the instructions for:

extracting one or more features from the source image; and wherein computing further comprises computing the visual similarity score between the target image and the source image as a function of the one or more features extracted from the source image and weights assigned to the one or more features extracted from the source image as a function of the orientation parameter.

* * * * *